Sept. 12, 1961 H. R. BENSON 2,999,419
FILM DOT ANALYZER
Filed Nov. 3, 1958
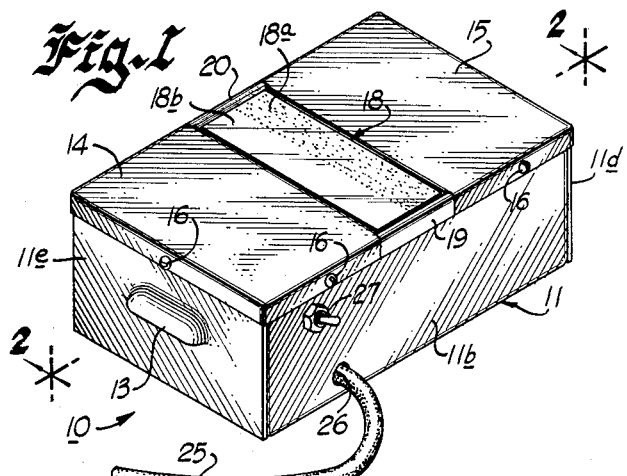
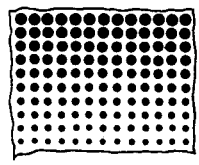
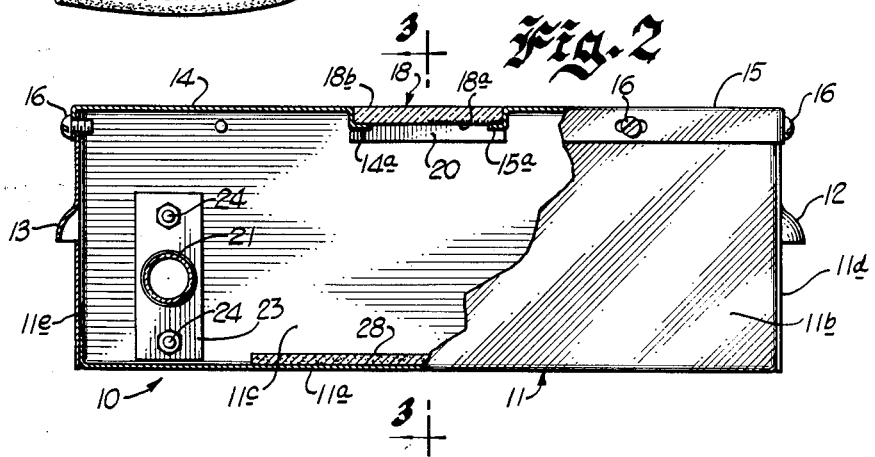
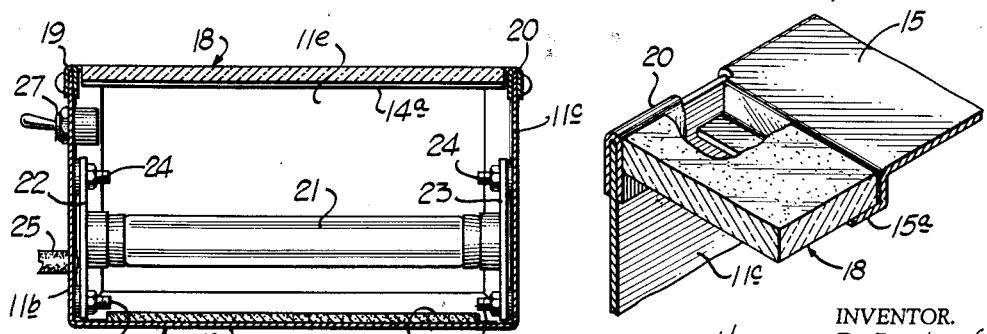
INVENTOR.
HAROLD R. BENSON
BY
Mason, Kolehmainen, Rathburn and Wyss.
ATTORNEYS.

United States Patent Office 2,999,419
Patented Sept. 12, 1961

2,999,419
FILM DOT ANALYZER
Harold R. Benson, Lombard, Ill., assignor to nuArc Co., Inc., Chicago, Ill., a corporation of Illinois
Filed Nov. 3, 1958, Ser. No. 771,329
1 Claim. (Cl. 88—14)

The present invention relates to a film dot analyzer, and more particularly to such an analyzer specifically useful in the graphic arts industry.

In the photoengraver's shop, as well as in newspaper, commercial printing and lithography plants, the problem of reproducing art is ever present. There are, of course, three major methods of reproducing art and copy, namely, letter press, lithography and gravure. Sometimes more than one of these methods is employed to produce a single product such as a magazine of large circulation. When art work is to be reproduced by any of these standard printing processes, it is first rephotographed on film, and this film is used to make the photoengraving which is a photographic image of the original on metal. The differences in the major printing processes, namely, letter press, lithography and gravure, reside in the nature of reproducing the photographic image on the metal. In one process the image is in relief on the metal plate, and in another it is level with the surface, and in the third process it is etched or incised. Where the final printed product is in black and white, only one photoengraved plate is necessary to reproduce the image, but for two or more colors separate plates are used for each color, which means that when printing is done the plates must be successively run through the printing press for each color.

In preparing the plates from the original photographic film, the resultant photoengraving or metal printing plate depends entirely upon the quality of the original photographic film. The original art work is commonly photographed through two sheets of glass sandwiched together. Fine horizontal lines are scratched in one and vertical lines in the other, thus producing the screen which breaks up the image before it reaches the negative. In coarse reproduction such as is used in the ordinary newspaper, a screen with sixty-five lines per inch is commonly used, while for magazine reproduction screens of one hundred twenty or more lines per inch may be used. The finer the screen, the more faithfully will the original art work be reproduced.

In analyzing any photograph it will be determined, in the case of a black and white reproduction, to be a geometric arrangement of small areas of light and shade. Thus a printed picture reproduced from a photoengraving will be found to be composed of many fine printed dots, the dots being small in diameter or missing altogether in the highlights and of larger diameter in the shadows. These printed dots comprise the picture elements and correspond to the fine grains of silver distributed throughout the picture area in a photographic print. The fine grains of silver are also picture elements. The satisfaction that any picture can give to the observer when viewed at a stated distance depends upon the size of the picture elements. If the picture elements are small and numerous, fine detail is possible and the picture may be examined closely without the individual picture elements themselves being evident. On the other hand, if the picture elements are large, as they are, for example, in the ordinary sixty-five-line halftone engravings employed in newspaper printing, the dots become evident upon close inspection, and such a picture is acceptable only if viewed at a distance or a foot or two away, whereby the picture elements such as the dots are not separately discernible.

The dot structure in photographic film which is to be reproduced as a photoengraving should comprise dots which are very black over the entire dot area. In the case of a poor photographic reproduction, the dots may have a sort of halo surrounding them of shadowlike appearance, which makes it very difficult to make a satisfactory photoengraving therefrom.

Most photoengraving shops have a light table which comprises a large area of frosted glass permitting the inspection of photographic film and the like by placing them on the light table. I have discovered, however, that such light tables do not permit satisfactory analysis of photographic film prior to photoengraving so as to enable the photoengraver to determine whether the film is satisfactory in advance of use. It would, therefore, be desirable to provide apparatus which would permit analysis of the film dot structure of photographic film in a very simple manner to determine whether or not the film is satisfactory.

Accordingly, it is an object of the present invention to provide improved means for analyzing photographic film prior to reproducing it on a metal plate by a photoengraving process.

It is another object of the present invention to provide a film dot analyzer for readily and accurately analyzing the dot structure of photographic films.

Still another object of the present invention resides in an improved apparatus useful in the graphic arts industry which is simple and compact and which will give years of trouble-free service.

Further objects and advantages of the present invention will become apparent as the following description proceeds, and the features of novelty which characterize the invention will be pointed out with particularity in the claim annexed to and forming a part of this specification.

For a better understanding of the present invention, reference may be had to the accompanying drawing in which:

FIG. 1 is a perspective view of a film dot analyzer embodying the present invention;

FIG. 2 is a side elevational view taken partly in section along line 2—2 of FIG. 1 of the apparatus shown in FIG. 1;

FIG. 3 is a sectional view taken on line 3—3 of FIG. 2, assuming that FIG. 2 shows the complete structure;

FIG. 4 is an enlarged fragmentary perspective view of a portion of FIG. 1;

FIG. 5 is a fragmentary view of a photographic reproduction showing the conventional dot structure employed;

FIG. 6 is a greatly enlarged elevational view of the material comprising a single dot of the dot structure shown in FIG. 5 where the dot structure is satisfactory; and FIG. 7 is a view similar to FIG. 6 showing an unsatisfactory dot structure.

Briefly, the present invention is concerned with a simple light box having a unique arrangement of viewing means and illumination means to permit a simple analysis of the dot structure of the photographic film which is to be converted into photoengravings. It comprises a light box containing a source of illumination which is disposed at a particular angular relationship with respect to a viewing area, which viewing area includes a section of clear glass and a section of frosted glass in side-by-side arrangement.

Referring now to the drawing, there is illustrated in FIGS. 1 to 4 a film dot analyzer generally designated by the reference numeral 10. Such a film dot analyzer may comprise several sizes depending upon the nature of the photoengravings to be made. In one embodiment built in accordance with the present invention a film dot analyzer having a viewing area twenty-four inches in length was employed, and in another embodiment of the present invention a viewing area of only seven inches in length was employed. The principles of the present invention are the same in either case, however, and the particular size is unimportant as far as the present invention is concerned and is determined by the size of the photoengravings to be produced. As illustrated, the film dot analyzer 10 comprises a boxlike structure 11, illustrated as of rectangular configuration, having a bottom 11a, side walls 11b and 11c, and end walls 11d and 11e, respectively. It will be appreciated that the boxlike structure 11 may be manufactured from any suitable materials such as wood, metal, plastic or the like. As illustrated in the drawing, they comprise sheet metal sections joined together by spot welding or the like. The end walls 11d and 11e are deformed as indicated at 12 and 13, respectively, to provide a sort of louvre for the circulation of air between the interior and exterior of the boxlike structure 11, and also to provide a handle structure for carrying the film dot analyzer 10 from place to place.

For the purpose of enclosing the open top of the box 11 and simultaneously providing a viewing area, there is provided a cover member comprising sections 14 and 15 of substantially identical structure which are not of sufficient size to enclose the entire area of the open top of the light box 11. As illustrated in the drawing, each cover section 14 and 15 has a depending annular flange around substantially the entire periphery thereof so that these cover sections may be secured one to each end of the open top of the box 11, as clearly shown in the drawing. Suitable fastening means 16, such as self-tapping screws, may be employed to secure these cover sections to the box 11. The adjacent edges of the cover sections 14 and 15 are spaced apart to define a viewing area. In an embodiment built in accordance with the present invention this space was several inches in width, in the case of a twenty-four-inch analyzer being between four and five inches in width, and in a seven-inch analyzer being between two and three inches in width.

In order to support a viewing member, each of the cover sections 14 and 15 on the adjacent edges thereof is provided with a lateral flange projecting from the depending flange, the cover section 14 being provided with such a lateral flange 14a, while the cover section 15 is provided with a lateral flange 15a. These lateral flanges 14a and 15a, as is clearly apparent from FIGS. 2 and 4 of the drawings, are directed toward each other to provide a shelf for supporting a light transmitting viewing member 18. As illustrated, the lateral flanges 14a and 15a are disposed at a level beneath the top of the cover sections 14 and 15 equal to the thickness of the viewing member 18 so that the top surface of the film dot analyzer 10 is flush from end to end or, in other words, the top of the cover sections 14 and 15 and the top surface of the viewing member 18 are all disposed in a single plane.

To improve the appearance, the exposed top edges of the side walls 11b and 11c between cover sections 14 and 15 are enclosed by a U-shaped member designated as 19 for the side wall 11b and 20 for the side wall 11c. These U-shaped members are preferably spot welded or otherwise secured to the associated side walls thereby providing an attractive finished appearance.

In accordance with the present invention, the viewing element 18 comprises a unitary piece of plateglass of sufficient area to fill the space between the cover members 14 and 15 and the U-shaped members 19 and 20. In an embodiment built in accordance with the present invention the element 18 comprised plateglass one quarter inch in thickness. In accordance with the present invention, one half of the glass area 18 is sandblasted so as to provide a frosted appearance, and this sandblasted area is designated at 18a, the sandblasting being done on the underside so as not to interfere with having a smooth surface at the exposed top of the film dot analyzer 10. The other half of the member 18 is clear glass and is designated by the reference numeral 18b. These two areas 18a and 18b, formed in a single piece of glass, are clearly discernible in FIG. 1 of the drawing.

For the purpose of illuminating the interior of the box structure 11 of the film dot analyzer 10, a suitable light source is mounted in the box structure 11. As illustrated, a fluorescent lamp designated at 21 is supported on suitable brackets 22 and 23 secured by fastening means 24 such as rivets, bolts or the like to the interior walls of the housing 11. It will be understood that instead of a source 21 of fluorescent light an incandescent light source such as a light bulb of the elongated type commonly available on the market may be employed. The particular source of illumination is not important as far as the present invention is concerned. However, the location of the light source in the box 11 relative to the viewing window 18 is very important. As illustrated, the light source is mounted near the bottom at one end of the box 11 so that the angular relationship between the light source and the viewing surface 18 is between twenty and forty-five degrees. In other words, a line perpendicular to the longitudinal axis of the light source 21, directed toward the viewing surface 18, should have an angular relationship with the top of the light box 11 which is an acute angle and preferably within the range of twenty to forty-five degrees. It will be apparent that due to the finite width of the viewing area 18 a variation in angular relationship will be involved, but this angular relationship has been found to be fairly critical for most satisfactory results.

As illustrated, a suitable power cord 25 is provided for energizing the lamp 21 from a suitable power source. This power cord enters the box 11 through a suitable opening 26. A manually actuatable switch 27, mounted on one of the side walls of the box 11, is connected in the electrical circuit of the lamp 21 for controlling the same in a well understood manner. Preferably the interior of the box 11 is coated with a black coating and, if desired, a black felt layer 28 may be inserted in the bottom to eliminate undesirable reflections.

In FIG. 5 of the drawing there is illustrated a fragmentary portion of a photographic film showing the dot structure as it appears when examined rather closely. The lighter areas comprise dots of smaller size, and the darker areas comprise dots of much larger size. If the dot structure were examined in elevation under a microscope, it would appear as illustrated in FIGS. 6 and 7, depending upon the nature of the dot structure. Fig. 6 illustrates a satisfactory dot structure which would appear as a black dot on the film. FIG. 7 illustrates an unsatisfactory dot structure which might be described as appearing somewhat like a pile of hay terminating in a very small area at the top. Such a dot structure when viewed from the top has a fringe area which is not black as it should be, but which gives a sort of halo effect. The photoengraver is desirous of determining whether the dot structure of the film from which the photoengraving is to be reproduced is satisfactory as illustrated in FIG. 6, or is unsatisfactory as illustrated in FIG. 7. It has been found that with the apparatus 10 of the present invention this can readily be determined by placing such a film over the area 18 so that it may be viewed not only through the frosted section but through the clear area. By simultaneously viewing the negative through both areas, the satisfactoriness of the dot structure is readily determinable, which is not true when the examination is made on the ordinary frosted glass of the conventional light tables used in every printing plant or associated shops.

Although the theory underlying why the simultaneous viewing of a photographic negative illuminated through a clear glass and frosted glass section is not fully understood, extensive tests have demonstrated that it readily enables the photoengraver to analyze accurately the negative, resulting in greatly improved reproduction in the photographic arts industry.

While I have illustrated and described a particular embodiment of the invention, it will be understood, of course, that the invention is not limited thereto, since many modifications may be made, and it is, therefore, contemplated by the appended claim to cover any such modifications as fall within the true spirit and scope of the invention.

What is claimed as new and desired to be secured by Letters Patent of the United States is:

An analyzer for the dot structure of photographic film comprising, a rectangular light box having a pair of identical cover members which together cover less than the entire top of said box so as to leave a space between said cover members at the center of said box, flange members integral with said cover members extending into said space below the top of said cover members to define a shelf, a light transmitting viewing surface supported on said shelf, said viewing surface comprising two adjacent sections one formed of clear glass plate and the other formed of frosted glass plate, a lamp disposed in said box adjacent one end thereof and near the bottom of said box, the lamp being disposed so that a line interconnecting said lamp and said viewing surface makes an angle within the range of twenty degrees to forty-five degrees with the plane of said cover members.

References Cited in the file of this patent

UNITED STATES PATENTS

| | | |
|---|---|---|
| 1,935,267 | Hewitt | Nov. 14, 1933 |
| 2,134,650 | Williams | Oct. 25, 1938 |
| 2,245,563 | Berggren | June 17, 1941 |
| 2,246,561 | Wheelan et al. | June 24, 1941 |
| 2,288,143 | Sheppard | June 30, 1942 |
| 2,567,561 | Hoffmann | Sept. 11, 1951 |
| 2,619,004 | O'Brien et al. | Nov. 25, 1952 |
| 2,689,422 | Hoff | Sept. 21, 1954 |
| 2,707,415 | Rooney | May 3, 1955 |